L. R. Briesch
BEST AVAILABLE COPY
Reaping Chair
No. 7799. Patented June 11, 1851.
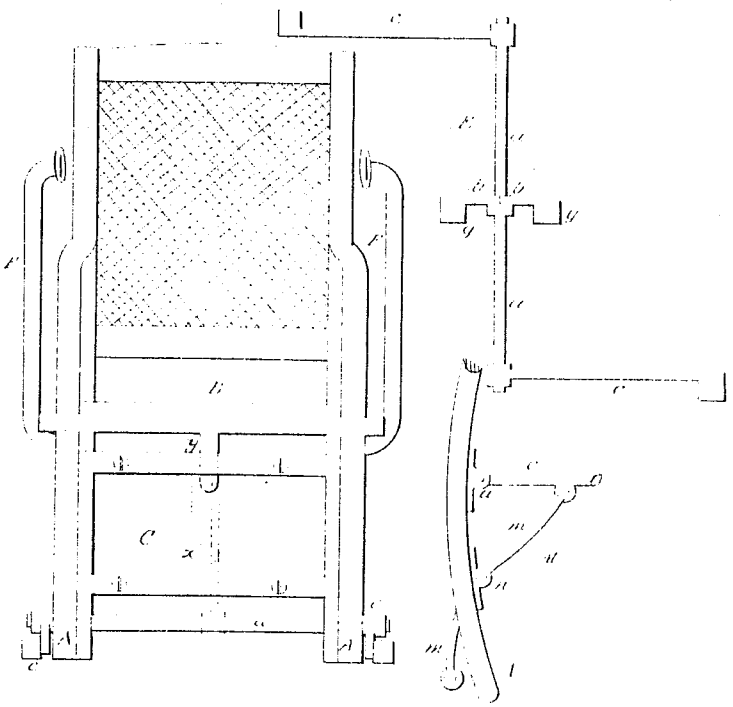
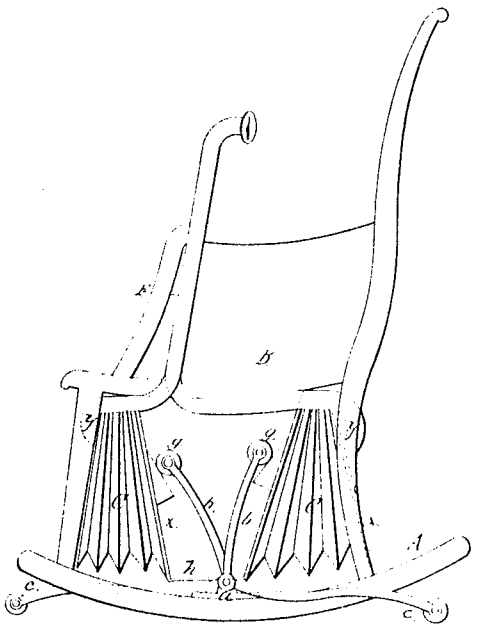
Witnesses:
A. J. Sebbaye
Civil Engineer
Inventor
L. R. Briesch
N. PETERS, PHOTO-LITHOGRAPHER, WASHINGTON D. C.